United States Patent
Neudorf

(12) 
(10) Patent No.: US 6,422,515 B1
(45) Date of Patent: Jul. 23, 2002

(54) DEVICE FOR PICKING UP AND DROPPING LOADS BY HELICOPTERS WITHOUT HELP OF GROUND PERSONNEL

(75) Inventor: Abraham Jack Neudorf, Taber (CA)

(73) Assignees: R. J. Bergen; A. J. Neudorf, both of Taber (CA)

( * ) Notice: Subject to any disclaimer, the term of this patent is extended or adjusted under 35 U.S.C. 154(b) by 0 days.

(21) Appl. No.: 09/694,499

(22) Filed: Oct. 24, 2000

(51) Int. Cl.⁷ .................................................. B64D 1/12
(52) U.S. Cl. ...................................................... 244/137.4
(58) Field of Search ........................... 244/137.4, 137.1, 244/118.1; 294/82.24, 82.26, 82.3, 82.19, 82.31; 258/1.2, 1.4, 1.6, 1.8

(56) References Cited

U.S. PATENT DOCUMENTS

| | | | |
|---|---|---|---|
| 3,227,401 A | * | 1/1966 | Currier |
| 3,601,342 A | * | 8/1971 | Piasecki ..................... 244/137 |
| 4,113,207 A | * | 9/1978 | Dalziel ........................ 244/137 |
| 4,523,746 A | * | 6/1985 | Chapman ..................... 258/1.2 |
| 5,927,649 A | * | 7/1999 | Nykiforuk ............... 244/118.1 |

\* cited by examiner

*Primary Examiner*—Peter M. Poon
*Assistant Examiner*—Kevin Jakel
(74) *Attorney, Agent, or Firm*—I. Zborovsky

(57) ABSTRACT

A device for picking up and dropping loads by helicopter without help of ground personnel has a member connected to a load; a magnetic member adapted to attract the member connected to the load; a channel associated with the magnetic member so that the member connected to the load and attracted to the magnetic member slides through the channel to a predetermined portion of the channel; a gate in the portion and including a first gate forming element and a second gate forming element spaced from one another and alternatingly activatable by a pilot so that, by activating the first gate forming element the member connected to the load is introduced into said gate, wherein when the second gate element is activated the gate is opened and the member connected to the load leaves the channel so as to drop off the load.

12 Claims, 5 Drawing Sheets

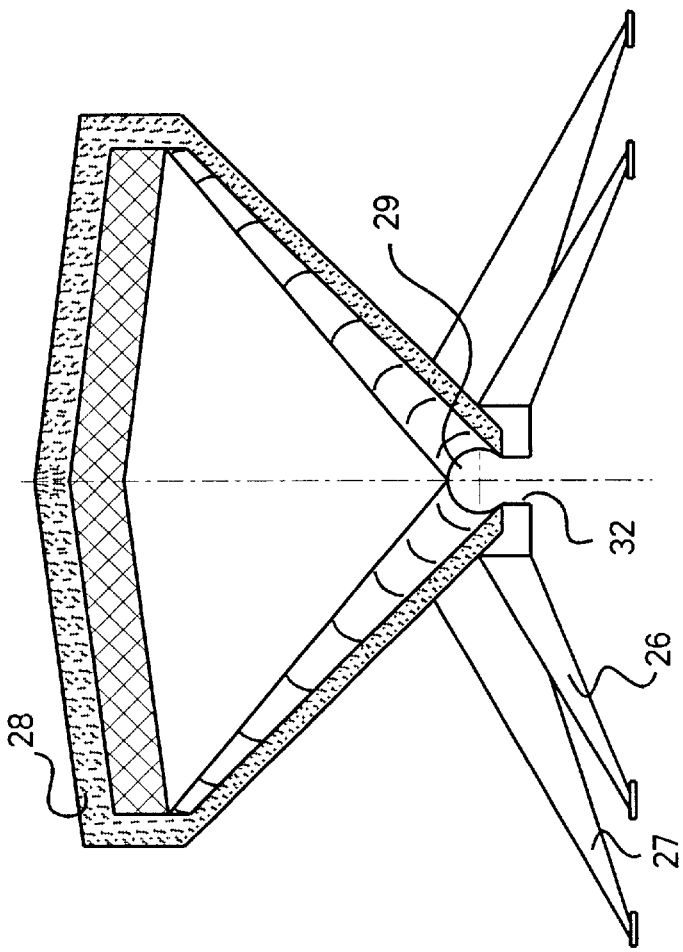
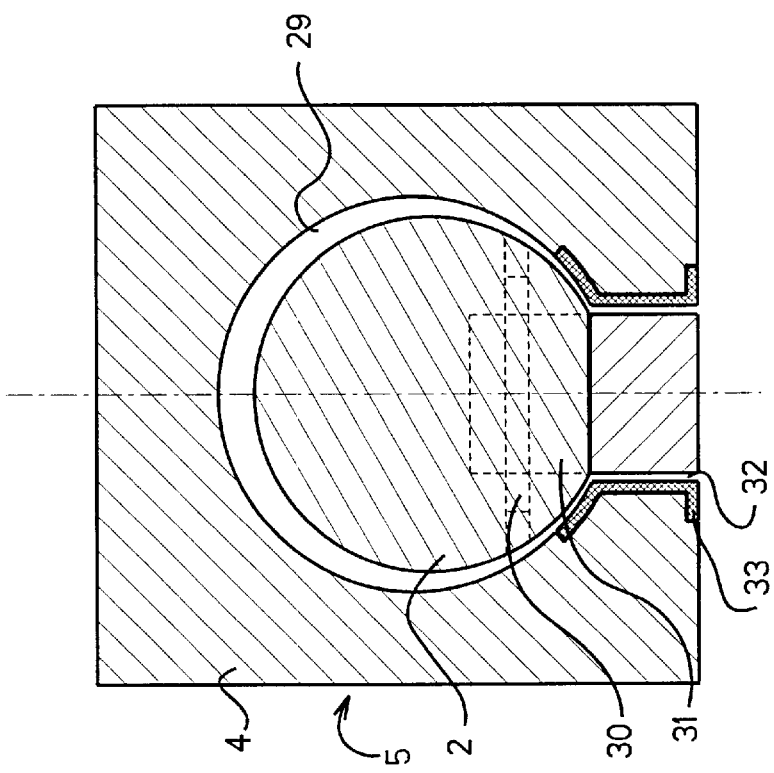

DEVICE FOR PICKING UP AND DROPPING LOADS BY HELICOPTERS WITHOUT HELP OF GROUND PERSONNEL

BACKGROUND OF THE INVENTION

The present invention relates to a device for dropping off and picking up loads with a helicopter.

Devices of the above mentioned general type are known in the art. The known devices have however some disadvantages. They do not make possible a determination whether double bag drops occurred, or the deployed bag has become tangled with a rack. Also, they require the use of a ground personnel to hook up the lines for pickup, which is difficult in remote terrain and expensive for the operator.

SUMMARY OF THE INVENTION

Accordingly, it is an object of the present invention to provide a device for helicopter dropping off and picking up of loads, which avoids the disadvantages of the prior art.

In keeping with these objects and with others which will become apparent hereinafter, one feature of present invention resides, briefly stated, in a device for helicopter dropping off and picking up of loads which has a member connected to a load; a magnetic element adapted to attract a member attached to the load; means forming a channel associated with the magnetic member so that the member connected to the load and attracted to the magnet slides through the channel to a predetermined portion of the channel; means forming a gate in the portion and including a first gate forming element and a second gate forming element spaced from one another and alternatingly activatable by a pilot so that by activating the first gate forming element the member connected to the load is introduced into the gate, wherein when the second gate forming element is activated the gate is opened and the member connected to the load leaves the channel so as to drop off the load.

When the device is designed in accordance with the present invention, no ground personnel is required. The pilot can determine whether the bag is at the gate, whether the lanyard was tangled within the rack, etc. The device eliminates double back drops, eliminates flying in foot runners to hook up bags with pulled pins, bags on side hills, bags with bad cone setups or bags that the pilot could not otherwise retrieve for whatever reasons. The pilot does not have to be precise or be afraid of knocking over the target and not being able to retrieve the bag. The device is ideal for all terrain, in the prairies or mountains with hand cut lines.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 is a view showing the cross-section of the ball connected to the load and of the channel in which the ball is located; and FIG. 6 is a front end view of the inventive device.

DESCRIPTION OF PREFERRED EMBODIMENTS

Figures 1A, 1B:
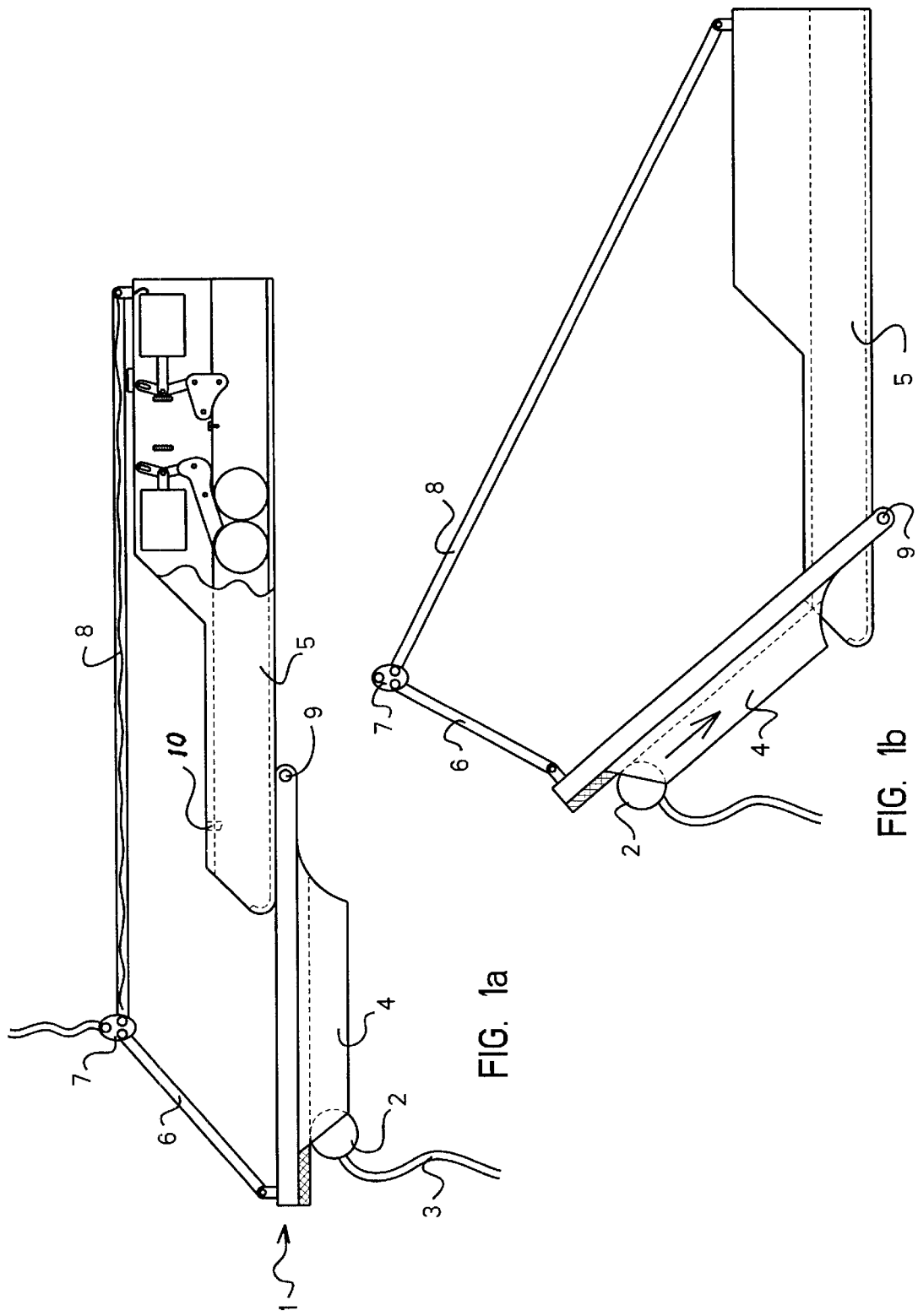
FIGS. 1a and 1b are side views of the inventive device for dropping off and picking up of loads in an initial position of the ground, and in the position in which it is somewhat lifted, correspondingly.
Figure 2:
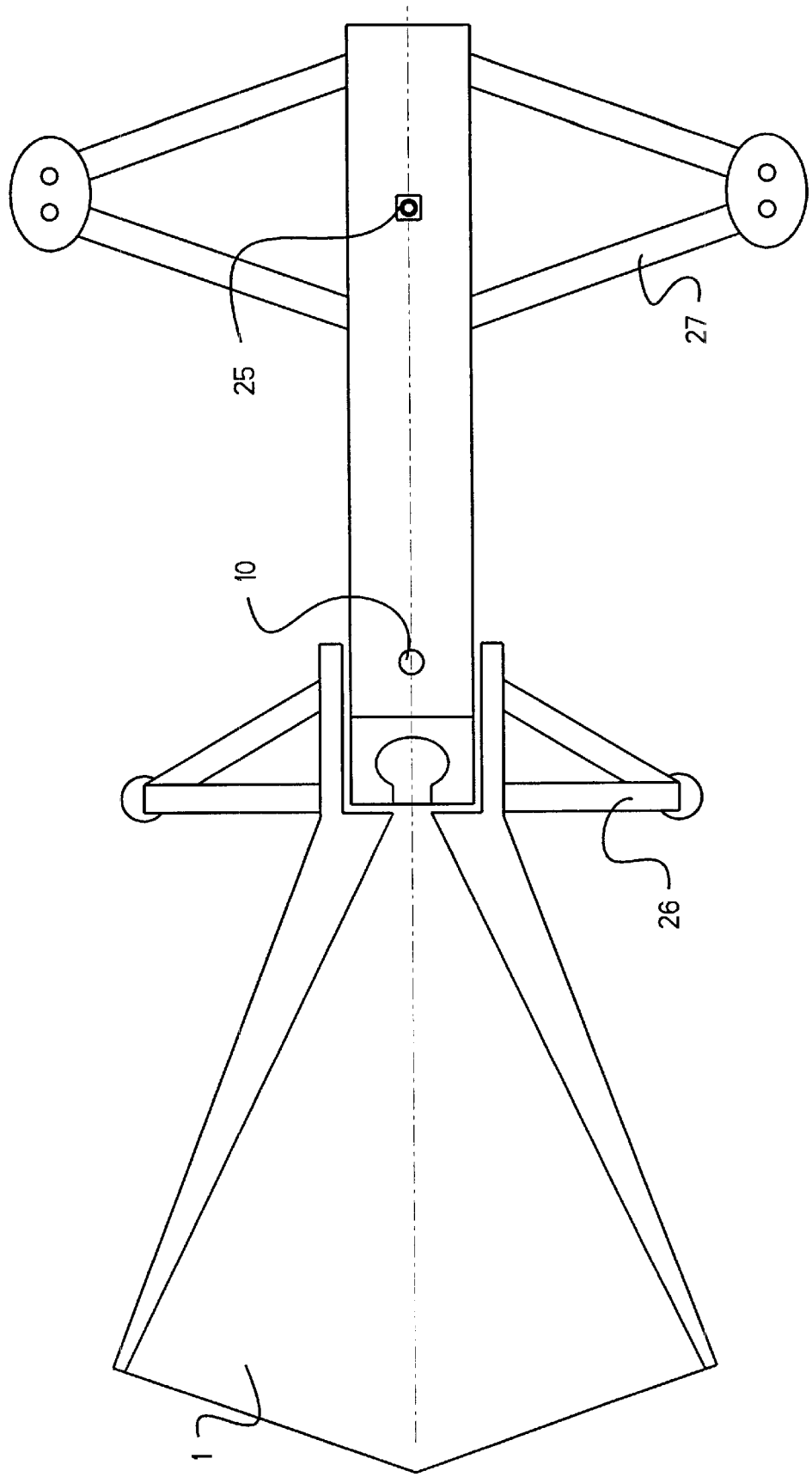
FIG. 2 is a plan view of the inventive device for dropping off and picking up loads.
Figure 3:
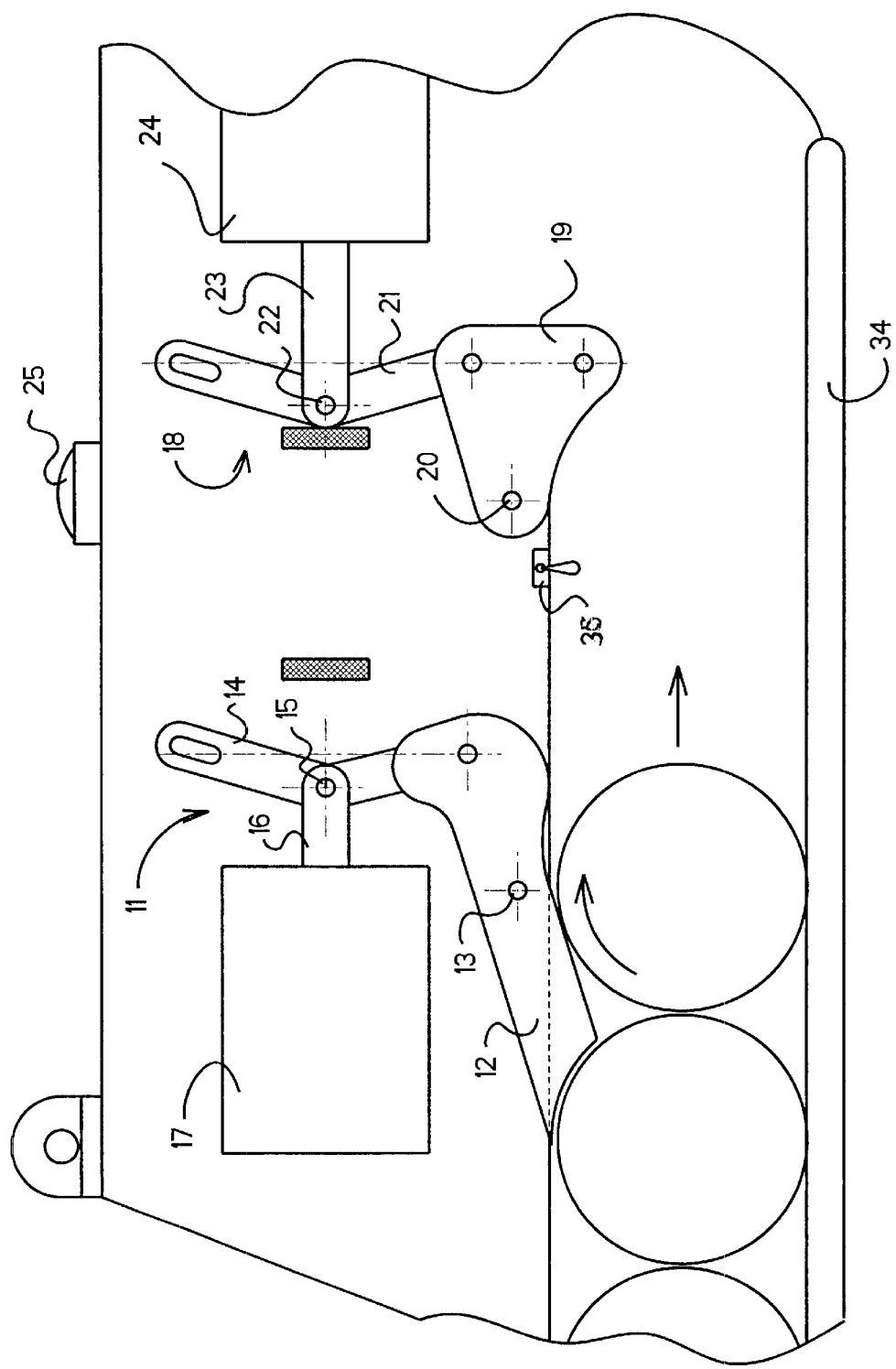
FIG. 3 is an enlarged view of the gate of the inventive device in a position in which one of the balls connected by lanyard to a load moves into a gate formed in the device.
Figure 4:
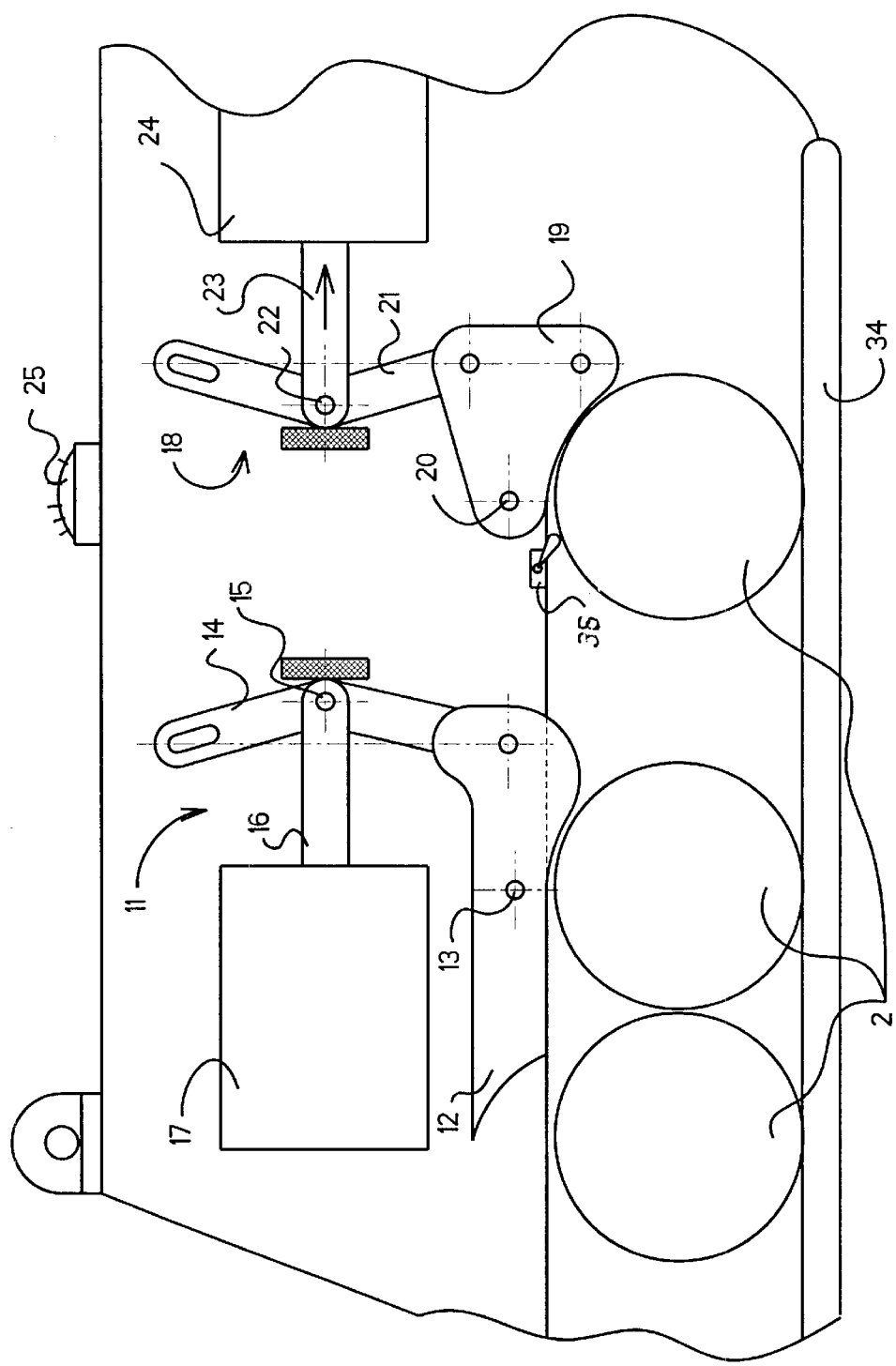
FIG. 4 is a view corresponding to the view of FIG. 3 but showing the ball located in the gate before leaving the gate.

A device for dropping off and picking up of loads with a helicopter in accordance with the present invention has an elongated magnet which is identified with reference numeral 1. The device cooperates in conjunction with a member connected to a load, in particular a ball shaped member 2 connected by a lanyard 3 to the load. The magnet 1 attracts the ball 2 by forces of magnetic attraction.

The device further has a channel including a first channel portion 4, and a second channel portion 5. The first channel portion 4 is to formed as a guide which has an inner substantially circular opening which is open downwardly through a bottom opening. At the left end in FIGS. 1a, 1b the channel 4 together with the magnet 1 are pivotably connected to a connecting rod 6 which is pivotably connected by its opposite end to a joining member 7. The opposite end of the second channel 5 is pivotably connected to a connecting rod 8 which is pivotably connected with its opposite end to the joining member 7 as well. The connecting rod 8 is hollow and carries inside all necessary wiring.

The first channel 4 and the second channel 5 are also pivotably connected with one another by a pivot joint 9. The left end of the channel 5 in the drawings is provided with a stopping element 10, formed preferably as a spring biased pin which is biased by a not shown spring into the interior of the channel 5, to stop displacement of the balls to the left and out of the channel 5.

In the right end of the channel 5 as shown in FIG. 1, means are provided for forming a gate for receiving a single ball at a time. The gate forming means include a first gate forming member including a first set of levers 11 with a bottom lever 12 pivotable about a pivot point 13 and a top lever 14 pivotably connected with the bottom lever 14 and connected by a pivot pin 15 to a rod 16 of a first solenoid 17. A second gate forming element has a second set of levers 18 with a bottom lever 19 pivotable about a pivot point 20 and a top lever 21 pivotably connected with the bottom lever 19 and also connected by a pivot point 22 with a rod 23 of a second solenoid 24. Reference numeral 25 identifies a light which is visible from outside of the channel 5, reference numeral 35 identifies a switch for the light 25. The channels 4 and 5 are provided also with legs 26 and 27 as shown in FIGS. 1 and 6. The magnet 1 and the channel 4 are confined in a casing which is identified with reference numeral 28 on FIG. 6.

FIG. 5 shows a cross-section of the channel 4 and the ball 2. The channel 4 is provided with an inner circular opening 29 which is slightly bigger than the cross-section of the ball 2. The ball has a pin 30 located in a sleeve which extends through the bottom opening 32. While the sleeve 31 preferably is composed of aluminum, stainless steel sliders 33 line the bottom opening 32 and the lower portion of the opening 29. Finally, the channel 5 is provided with Teflon coated ball rails 34.

The device operates in the following manner:

In order to pick up a load connected by the lanyard 3 to the ball 2, the device is lowered and the ball 2 is attracted to the magnet 1. Then the device is lifted, the channel 4 assumes an inclined position and the ball 2 slides into the channel 4 under the action of gravity and then into the channel 5 to the region of the gate between the gate forming members 11 and 18. The pilots presses a reset button on the helicopter which, through a first wire, activates the solenoid 17 and the latter turns the lever of the first gate forming member 11 so that the lower lever 12 is lifted and the ball enters the area of the gate between the gate forming members 11 and 18. The ball acts on the switch 35 which turns the light 25 so that the pilot can determine that the bag is at the gate.

In order to drop off the load, the pilot activates the drop button which, through a second wire, acts on the solenoid 24 so that the second gate forming member 18 is activated, the lever 19 is turned and the ball slides to the right and out of the channel 5 so that the load is dropped. At this point the light is turned off. If the light is turned off but no bag was dropped on the ground, the pilot will know that the lanyard was tangled within the rack. Thus, the two button process eliminates all double bag drops and indicates whether the device misfired or if the deployed bag has become tangled within the rack.

It will be understood that each of the elements described above, or two or more together, may also find a useful application in other types of constructions differing from the types described above.

While the invention has been illustrated and described as embodied in device for helicopter line loads, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

I claim:

1. A device for helicopter dropping off and picking up of loads, comprising a member connected to a load; a magnetic member adapted to attract the member to the load; means forming a channel associated with said magnet member so that the member connected to the load and attracted to the magnetic member slides through said channel to a predetermined portion of said channel; means forming a gate in said portion and including a first gate forming element and a second gate forming element spaced from one another and alternatingly activatable by a pilot so that, by activating said first gate forming element the member connected to the load is introduced into said gate, wherein when said second gate forming element is activated said gate is opened and said member connected to the load leaves said channel so as to drop off the load.

2. A device as defined in claim 1, wherein said first gate forming element includes a first lever element, while said second gate forming element includes a second lever element.

3. A device as defined in claim 2; and further comprising a first solenoid activating said first lever element and activatable by the pilot and a second solenoid activating said second lever element and activatable by the pilot.

4. A device as defined in claim 1; and further comprising a light element arranged in said portion of said channel and visible from outside, said light element being formed so that when the member connected to the loads is in said gate said light element is on, and when the member connected to the load leaves said gate, said light element is off.

5. A device as defined in claim 4; and further comprising a switch located in a region of said gate and activatable by the member connected to the load so as to turn an aid light element on, and deactivatable when the member connected to the load leaves said gate so as to turn said aid light element off.

6. A device as defined in claim 1, wherein said means forming the channel include a first guide extending along said magnet and having an open end for entry of the member connected to the load.

7. A device as defined in claim 6, wherein said means forming the channel also include a second guide which is pivotably connected to said first guide at an end of said first guide which is opposite to said open end.

8. A device as defined in claim 1; and further comprising means for preventing displacement of the member connected to the load in a direction which is opposite to a direction of movement of the member connected to the load into the channel.

9. A device as defined in claim 8, wherein said preventing means include a spring-biased member.

10. A device as defined in claim 1, wherein said member connected to the load is formed as a ball connectable to the load by a lanyard.

11. A device as defined in claim 10, wherein said ball is provided with a pin connectable with a lanyard.

12. A device as defined in claim 10, wherein said channel has an entry portion with a circular cross-section corresponding to a cross-section of said ball.

\* \* \* \* \*